United States Patent [19]
Ogino

[11] Patent Number: 5,803,566
[45] Date of Patent: Sep. 8, 1998

[54] PROJECTION TYPE LIQUID CRYSTAL DISPLAY DEVICE

[75] Inventor: Masanori Ogino, Yokohama, Japan

[73] Assignee: Hitachi, Ltd., Tokyo, Japan

[21] Appl. No.: 835,781

[22] Filed: Apr. 8, 1997

[30] Foreign Application Priority Data

Apr. 17, 1996 [JP] Japan ................................. 8-095037

[51] Int. Cl.⁶ ............................................... G03B 21/16
[52] U.S. Cl. .............................. 353/60; 353/57; 353/52
[58] Field of Search ............................. 353/52, 54, 55, 353/56, 57, 60, 61; 349/161

[56] References Cited

U.S. PATENT DOCUMENTS

| | | | |
|---|---|---|---|
| 4,787,737 | 11/1988 | Ogawa | 353/57 |
| 4,963,001 | 10/1990 | Miyajima | 353/60 |
| 5,170,195 | 12/1992 | Akiyama et al. | 353/52 |
| 5,282,121 | 1/1994 | Bornhorst et al. | 353/54 |

FOREIGN PATENT DOCUMENTS

| | | | |
|---|---|---|---|
| 2130542 | 5/1990 | Japan | 353/52 |
| 5158152 | 6/1993 | Japan | 353/52 |

*Primary Examiner*—William Dowling
*Attorney, Agent, or Firm*—Kenyon & Kenyon

[57] ABSTRACT

Disclosed is a projection type liquid crystal display device. The device comprises a light source; collimator elements; a liquid crystal panel which produces an image; a light path wall which defines a closed space and which surrounds and supports at least one of the collimator elements and the liquid crystal panel; a projection lens; and a screen. The light path wall is provided with a heat dissipation promoter on the outer surface thereof.

21 Claims, 5 Drawing Sheets

PROJECTION TYPE LIQUID CRYSTAL DISPLAY DEVICE

BACKGROUND OF THE INVENTION

The present invention relates to a projection type liquid crystal display device which is improved in anti-dust characteristics.

In a projection type CRT (Cathode Ray Tube) display device, with regard to the quality of image thereof, deterioration problems have been almost fully solved, whose typical example is deterioration in the contrast ratio due to dust deposition on surfaces of optical elements. Contrasting, in the projection type liquid crystal display device, the dust deposition problem has been recognized in recent years, which leads to deterioration in the contrast ratio and the quality of image.

The problem of dust deposition, which leads to deterioration in the quality of image, will be described below with reference to FIG. 7 which is of a conventional projection type liquid crystal display device.

A projection type liquid crystal display device shown in FIG. 7 comprises a screen 1, a projection lens 2, a single plate type liquid crystal panel 3, a light path wall 4, collimator means 5, 6 and 8, a rear Fresnel lens 5, a front Fresnel lens 6, a spherical mirror 8 constituting a part of the light path wall, a lamp means 7 with electrode, and ventilating means 9, 9', 10 and 10'. Reference numerals 11, 12 and 13 denote air flows.

The Fresnel lenses 5, 6 are at least partially made of a resin material in general. The liquid crystal panel 3 is also partially made of a resin material, as is generally known. Thus, such components have been required to be kept at as low temperature as possible (60° C., for example) in order to prolong the lifetime. For this purpose, the ventilating means 9, 9', 10 and 10' were used to forcibly let the air out of the light path space to the outside space. However, there arose adverse effects by utilization of such ventilating means that the dust existing in the outside space entered into the light path space to deposit on the surfaces of the lamp 7, mirror 8, Fresnel lenses 5, 6 and liquid crystal panel 3 resulting in accumulation of dust on the surface of the liquid crystal panel during using for several months, for example, to deteriorate focussing performance and contrasting performance, which relates to the quality of image, as well as the light transfer efficiency. Further, there was another problem that the dust was burnt to become harmful soot because of a high temperature (about 900° C.) of the lamp 7.

To cope with this, a dust filter was provided to the display device at the boundary portion between the inside and outside spaces. However, it was impossible to avoid a problem that the filter was occluded with dust particles each having a large diameter while other dust particles each having a small diameter were allowed to pass through the filter resulting in that the dust problem could not be thoroughly solved.

Further, there was also a different problem that the lamp means having electrodes was short in lifetime.

SUMMARY OF THE INVENTION

An object of the present invention is to provide a projection type liquid crystal display device which is capable of decreasing or eliminating deposition dust on surfaces of main optical elements and achieving the dissipation of heat.

Another object of the invention is to provide a projection type liquid crystal display device which is further improved in the quality of image.

Still another object of the invention is to provide a projection type liquid crystal display device which has a longer lifetime.

Under such objects, there are proposed the following devices according to the present invention.

In accordance with a first aspect of the invention, there is provided a projection type liquid crystal display device comprising: light source means; collimator means; light path wall means which defines a closed space; liquid crystal panel means which produces an image; projection lens means; and screen means, the light path wall means surrounding at least one of collimator means and liquid crystal means, wherein the light path wall means is provided with thermal resistance reducing means for the inner surface thereof.

The liquid crystal display device of the invention can be provided as in the following embodiments.

1. The thermal resistance reducing means comprises Peltier effect device means which is provided on the light path wall means.
2. The thermal resistance reducing means comprises forced convection means which is provided in the closed space defined by the light path wall means.
3. The collimator means comprises a lens.
4. The lens comprises a Fresnel lens.
5. The light source means comprises a reflector which is one of the collimator means.
6. The light path wall means defines the closed space in cooperation with one of the collimator means.
7. The light path wall means defines the closed space in cooperation with one of the collimator means and the projection lens means.
8. The light source means comprises a liquid container means which contains liquid and a lamp means which is immersed in the liquid, the liquid container means comprising a collimator wall section and a light passing wall section and at least a part of the liquid container means being a spherical wall section.
9. A projection type liquid crystal display device comprising: a light source; collimator elements; a liquid crystal panel which produces an image; a light path wall which defines a closed space and which surrounds and supports at least one of the collimator elements and the liquid crystal panel; a projection lens; and a screen, wherein the light path wall is provided with a heat dissipation promoter on the outer surface thereof. The heat dissipation promoter may comprise a Peltier effect element.
10. A projection type liquid crystal display device comprising: a light source; collimator elements; a liquid crystal panel which produces an image; a light path wall which defines a closed space and which surrounds and supports at least one of the collimator elements and the liquid crystal panel; a projection lens; and a screen, wherein a mechanical stirrer is installed in the closed space defined by the light path wall, which produces a convection gas flow in the closed space whereby heat releasing is promoted through the light path wall. The mechanical stirrer may comprise rotating blades driven by a motor, or a pump.

In accordance with a second aspect of the invention, there is provided a projection type liquid crystal display device comprising: a light source; collimator elements; a liquid crystal panel which produces an image, a projection lens, and a screen, wherein the light source comprises a liquid container which contains liquid and a lamp which is immersed in the liquid, the liquid container comprising a collimator wall section and a light passing wall section and at least a part of the liquid container being a spherical wall section, and wherein a forced convection means is positioned by a side of the liquid container, which produces an air flow toward the liquid container to cool it. The forced convection means may be a cooling fan or an air blower.

In order to help understanding of the features of the invention, there is prepared the following table which is of a comparison of the invention and the prior art.

TABLE 1

COMPARISON OF PRESENT INVENTION WITH PRIOR ART

| | Present invention | | | |
|---|---|---|---|---|
| | Type I | Type II | Type III | Prior art |
| 1. Advantageous effects | | | | |
| 1.1 Heat dissipation | ○ | ○ | ○ | ○ |
| 1.1 Decrease in deposit of dust | ○ | ○ | ○ | Δ |
| 1.3 Eliminatin of deposit of dust | ○ | ○ | ○ | x |
| 2. Means or features | | | | |
| 2.1 Ventilating means for letting air flow through inside and outside spaces of light path | x | x | x | ○ |
| 2.2 Thermal resistance reducing means for light path wall | ○ | ○ | ○ | x |
| 2.3 Peltier effect device means provided on light path wall | ○ | — | — | x |
| 2.4 Forced convection means provided in closed space in light path | — | ○ | — | x |
| 2.5 Immersion lamp means | — | — | ○ | x |

Remarks
○: Yes
Δ: Insufrficient
x: No
—: Unrelated

PREFERRED EMBODIMENTS OF THE INVENTION

In the following embodiments of the invention, example values of capacity are those of a projection type liquid crystal display having a light output of about 300 lm (lumen).

Figure 1:
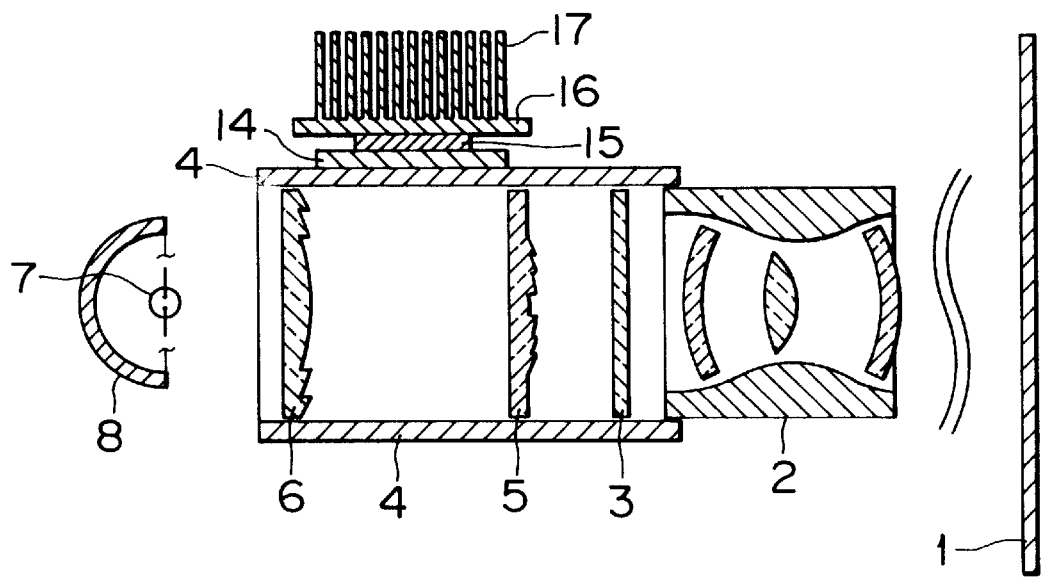
FIG. 1 is a sectional view of a first embodiment of the invention.
Figure 7:
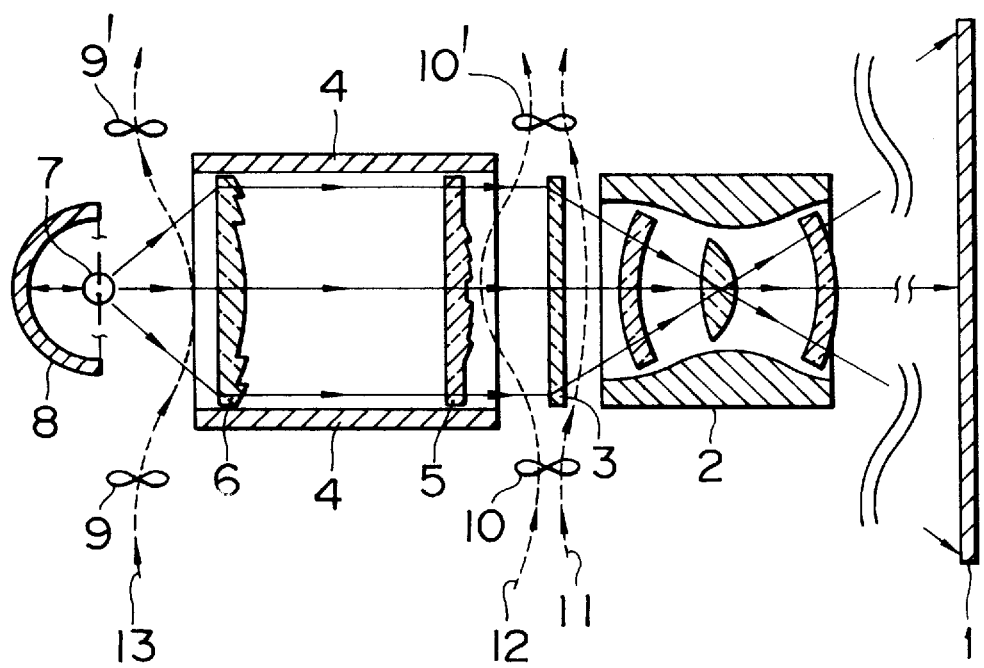
FIG. 7 is a sectional view of a device according to the prior art.

Description will be given of a projection type liquid crystal display device according to a first embodiment of the invention with reference to FIG. 1. In FIG. 1, reference numerals 1 to 8 denote the same components as those of the conventional device of FIG. 7, respectively. The display device of the embodiment comprises, as main constituents of an optical system, a lamp 7 with electrode and a reflector 8 which cooperate with each other to form a light source, and Fresnel lenses 6, 5, a single plate type liquid crystal panel 3 and a lens assembly 2 including a plurality of lenses, which are arranged at different distances from the lamp 7 in this order. The Fresnel lenses 6, 5 and the single plate type liquid crystal panel 3 are disposed inside a cylindrical light path wall 4 in such a manner that they are parallel to each other leaving different predetermined spaces between them. The light path wall 4 is closed at one end thereof adjacent to the light source by the Fresnel lens 6, while it is closed at the other end thereof remote from the light source by the lens assembly 2 fitted thereto. A closed space is defined by the light path wall 4 under such end closure structure. It is noted that the light path wall 4 has a plurality of ventilation orifices (not shown), having a size that allows no dust to pass through them, so as to prevent a pressure change by a temperature change in the interior space of the light path wall 4. A screen 1 is also one of the components of the display device and is arranged at a predetermined distance from the lens assembly 2.

The display device further comprises a Peltier effect device which has a heat absorbing plate 14 attached to an outer surface of the light path wall 4, a heat dissipating plate 16 provided integrally with radiation fins 17, and a Peltier effect element 15 interposed between the plates 14, 16. The Peltier effect element 15 is supplied with an electric power of about 10 W through the wiring (not shown) so as to make a temperature difference of about 20° C. between the plates 14, 16, thereby a heat flow of about 10 W is absorbed through the light path wall 4 by the heat absorbing plate 14 so that a heat flow of about 20 W is released from the heat dissipating plate 16 to the environment.

The above phenomenon can be obtained with utilization of a Peltier effect element on the market which has an effective heat path area of about (4 cm$^2$). Incidentally, although not indispensable, it is recommended to use a heat-conductive metal material as the material for the light path wall 4. It is possible to substitute the light path wall 4 with the heat absorbing plate 14. In FIG. 1, the Peltier effect element is provided on one side of the wall but it may be provided on both sides of the wall.

In the dust preventing closed structure shown in FIG. 1, when the outside temperature is 40° C., the temperatures of the Fresnel lens 5 and liquid crystal panel 3, which were as excessively high as 70° C. in the conventional device, can be decreased to about 60° C. or lower according to the above embodiment.

Figure 2:
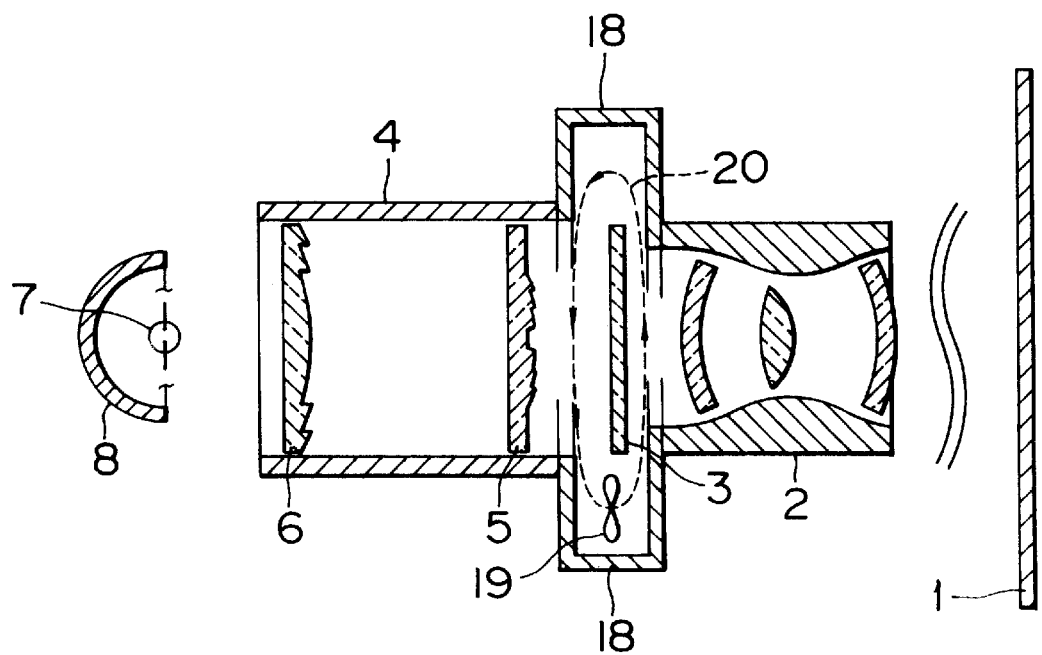
FIG. 2 is a sectional view of a second embodiment of the invention.

A projection type liquid crystal display device according to a second embodiment of the invention will be described below with reference to FIG. 2. In FIG. 2, reference numerals 1 to 8 denote the same components as those of the conventional device of FIG. 7, respectively. The display device comprises, as main constituents of an optical system, a lamp 7 with electrode and a reflector 8 which cooperate with each other to form a light source, and Fresnel lenses 6, 5, a single plate type liquid crystal panel 3 and a lens assembly 2 including a plurality of lenses, which are arranged at different distances from the lamp 7 in this order. The Fresnel lenses 6, 5 are disposed inside a cylindrical light path wall 4 in such a manner that they are parallel to each other leaving a predetermined space between them. A screen 1 is also one of the components of the display device and is arranged at a predetermined distance from the lens assembly 2. The light path wall 4 is formed in a portion thereof continuous with the lens assembly 2 with an extended wall section 18 which defines a large diameter chamber. The extended wall section 18 defines a closed space in cooperation with the cylindrical body section of the light path wall 4 and the lens assembly 2. In the closed space are disposed the liquid crystal panel 3 kept in parallel to the Fresnel lenses 6, 5, and a fan 19 which is a forced convection means. The fan 19 is located in the large diameter chamber defined around the liquid crystal panel 3 by the extended wall section 18. The fan 19 is driven by a small motor (not shown) on the market, whose output is about 1 to 4 W. When the fan 19 is rotated, there is produced an air flow in the closed space, which circulates around the liquid crystal panel 3 at a flowing speed of not less than about 1 m/sec.

According to the construction of this embodiment, it is possible to reduce the heat transfer rate of the inside wall of the extended wall section 18 by an amount of approximately one figure from about 1 $mW/cm^2$ to about 10 $mW/cm^2$. It is therefore possible to obtain the same effects as those of the first embodiment by supplying a less power (1 W to 4 W). Incidentally, in this embodiment as well, the heat radiation efficiency can be increased by additionally providing the radiation fins (designated by reference numeral 17 in FIG. 1) on the outside of the extended wall section 18.

Figure 3:
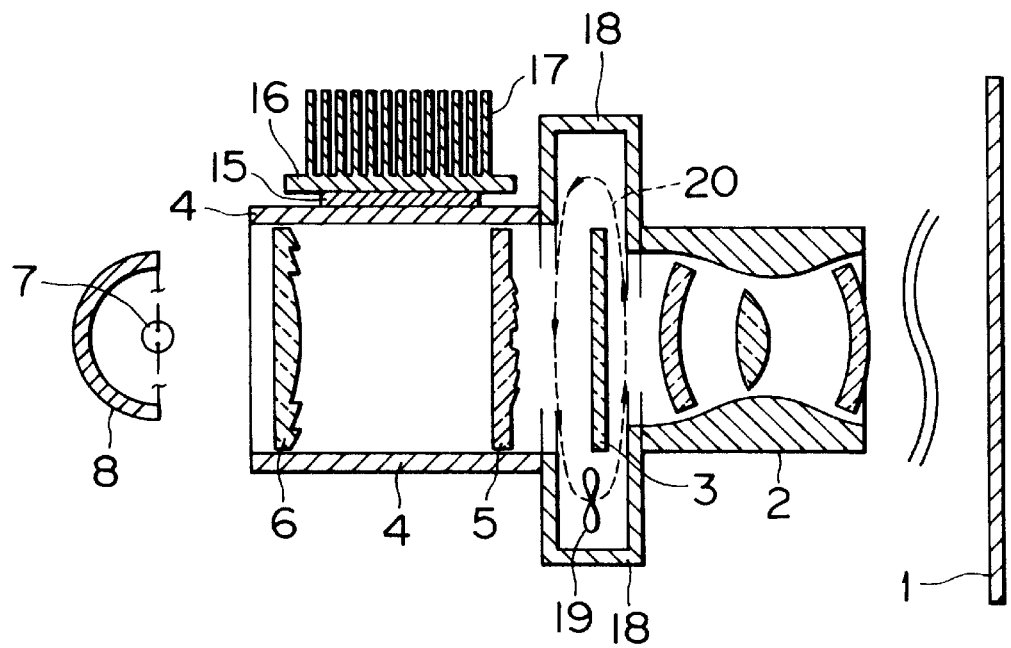
FIG. 3 is a sectional view of a third embodiment of the invention.

FIG. 3 shows a projection type liquid crystal display device according to a third embodiment of the present invention. The liquid crystal display device of this embodiment is obtained by a combination of the two embodiments of FIGS. 1 and 2, and is suitable for high power output.

Figure 4:
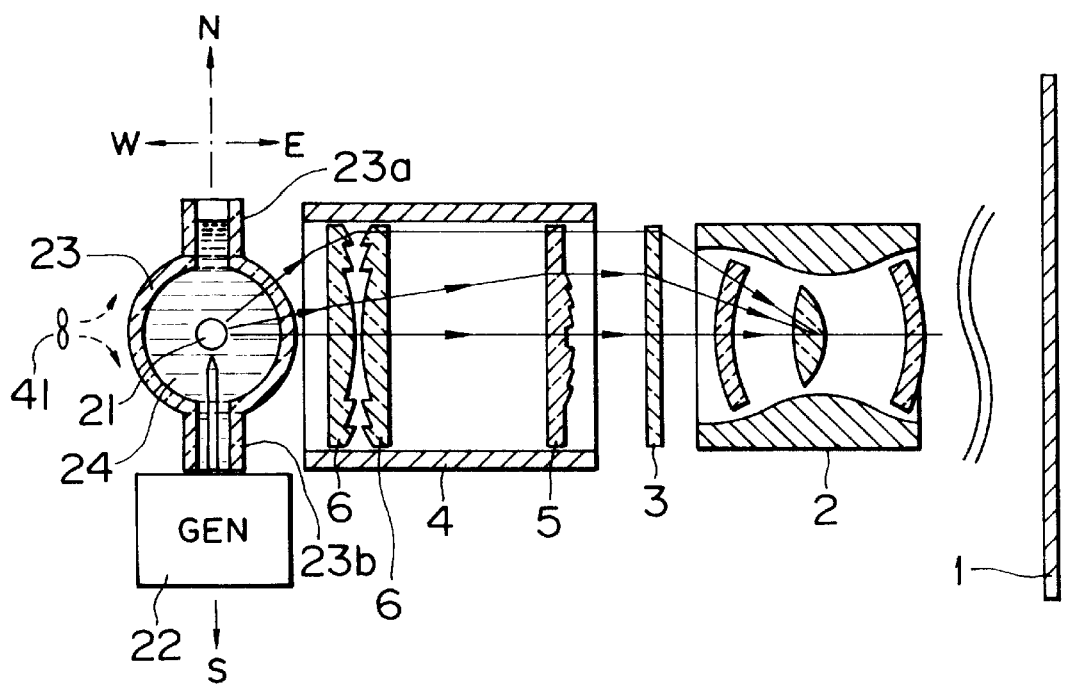
FIG. 4 is a sectional view of a fourth embodiment of the invention.

FIG. 4 shows a fourth embodiment of the present invention (which corresponds to the type III of the present invention in Table 1). FIG. 4 shows only the improvements in a section around a lamp.

A projection type liquid crystal display device according to the fourth embodiment of the present invention will be described below with reference to FIGS. 4 and 5. In FIG. 4, reference numerals 1 to 6 denote the same components as those of the conventional device of FIG. 7, respectively. The display device of this embodiment comprises, as main constituents of an optical system, an electrodeless lamp 21 as a light source, and Fresnel lenses 6, 6', 5, a single plate type liquid crystal panel 3 and a lens assembly 2 having a plurality of lenses, which are arranged at different distances from the lamp 21 in this order. A screen 1 also is one of the components of the display device and is arranged at a predetermined distance from the lens assembly 2. The Fresnel lenses 6, 6', 5 are disposed inside a cylindrical light path wall 4 in such a manner that they are parallel to each other leaving different predetermined spaces between them. The light path wall 4 defines a closed space in cooperation with the Fresnel lenses 6, 5. The liquid crystal panel 3 is disposed outside the closed space apart from the Fresnel lens 5, and the lens assembly 2 is further disposed apart from the liquid crystal panel 3.

The electrodeless lamp 21 is placed in the center of a spherical container 23 filled with a liquid 24. Namely, the electrodeless lamp 21 is an immersion lamp (or a lamp immersed in the liquid). The electrodeless lamp 21 is supplied with an electric power from a high-frequency power supply device 22. As for the high-frequency power supply device 22, a magnetron on the market which generates a power output of about 200 W in the 2.4 GHz band can be used, for example. A central conductor 22' is extended from the high-frequency power supply device 22 through an insulating member 22" attached in a portion of a housing of the power supply device 22 to the vicinity of the electrodeless lamp 21 located in the center of the spherical container 23.

Herein, in order to help best understanding of the explanation about the spherical container 23, supposed that the container 23 is a terrestrial globe, the directions of north, south, east and west are fixed on the drawing sheet with respect to the center located in the position of the electrodeless lamp 21 and indicated by symbols N, S, E and W, respectively. Incidentally, in the drawing, the components positioned above the insulating member 22" are rotary symmetric with respect to the axis of the central conductor 22' unless otherwise mentioned below, and FIG. 5 shows a sectional view taken along a plane which includes the meridian.

The spherical container 23, which is made of a transparent material, typically glass, has open-end cylindrical portions 23a, 23b formed integrally therewith on the opposite sides in the north-and-south direction. The cylindrical portion 23b is supported by a cylindrical supporting wall 22a projecting from the housing of the high-frequency power supply device 22. An O-ring 32 as a sealing member is interposed between the cylindrical portion 23b and the cylindrical supporting wall 22a to prevent the liquid 24 contained in the spherical container 23 to leak out. Alternatively, a sealing ring having a T-shaped cross section may be utilized instead of the O-ring whose annular inner section is fitted on the cylindrical portion 23b and an outer flange section thereof is fitted in a circumferential groove formed on the inner surface of the cylindrical supporting wall 22a. A disc-shaped conductor cap 29 is fitted on the open end of the cylindrical portion 23a to close it. The conductor cap 29 has a tubular conductor 28 integrally provided in the center thereof, which extends close to the electrodeless lamp 21 in the spherical container 23. A stem 21' of the electrodeless lamp 21 is passed through the conductor pipe 28 and is supported by a retainer 31 (such as an adhesive or a holder ring) at an opening of the conductor cap 29.

Here it is noted that an electric fan 41 as a forced convection means is disposed at the west side of the spherical container 23 with an appropriate distance.

Further, a western hemisphere outer surface 26 is provided with a mirror coating or film for reflecting the visible light, while an eastern hemisphere outer surface 27 is provided with a film which permits the visible light to transmit through it and reflects at least a part of the infrared light. One example of this kind of film is an ITD (Indium Tin Oxide) film. Reference numeral 25 denotes a shield net which prevents microwave of high-frequency electric power to leak to the outside of the container and forms a portion of a waveguide or a cavity resonator. One concrete example of the shield net has a lattice network structure, which is made from a wire material having a diameter of 50 µm and in which the wire spacing is 0.6 mm. Reference numerals 40, 40' denote electric conductive films provided on the outer surfaces of the cylindrical portions 23a, 23b, which are made of aluminum and have a thickness of about 1 µm or more, for example. Reference numerals 30 denote a part of the conductor cap 29, which is a comb-shaped plate spring type terminal conductor and which forms an electric current path to the electric conductive film 40 and the shield net 25.

An element suitable for emission of the visible light (Sulphur, for example) is prevously charged in the lamp 21.

Regarding the liquid 24, it is preferable to utilize a substance which causes a small dielectric loss in the high frequency band, such as silicone oil (dielectric loss: about 0.4% at 3 GHz of frequency) or fluorine system oil and which has a dynamic viscosity of not more than about 50 cm$^2$/sec in the steady operational state.

Herebelow, operation of the liquid crystal display device shown in FIGS. 4 and 5 will be described.

Electric power supplied from the high-frequency power supply device 22 produces a strong electromagnetic field at the position of the lamp 21 which is located between an end of the central conductor 22' and an end of the tubular conductor 28. Under the electromagnetic field, power is provided to plasma in the lamp so as to be transformed into light, infrared light and heat. The light is transmitted toward the east collimators. The infrared light is at least partially reflected back to the lamp side by the infrared light reflecting film or coating provided on the eastern hemisphere outer surface 27, and passes through the visible light mirror portion 26 at the western hemisphere to be emitted outside. The heat is transported by convection of the liquid 24 to the wall of the container 23 and efficiently dissipated from the outer surface thereof by the forced convection means 41. The forced convection means 41 provides an air flow only to the west side wall of the container 23 where visible light can not pass through, and thus no quality deterioration occurs due to deposition of dust. Further, since dust is not in direct contact with the high temperature lamp, it is prevented from burning to become black soot. Thus, it is possible to prevent the deterioration problem caused by soot with regard to the quality of image.

It is also unnecessary to directly cool the lamp by means of a high speed air flow, while such cooling has been necessary when using the electrodeless lamp, and thus it will be possible to drastically reduce the noise.

Further, since the effective light emitting surface of the container is spherical and the lamp is positioned in the center of the container, the light from the lamp passes through the relevant wall of the container in angles of incidence and emission substantially perpendicular to the inner and outer surfaces of the wall. It is therefore possible to prevent the loss of light caused by the total reflection at the wall surfaces, thereby making it possible to minimize the reflection loss.

Figure 5:
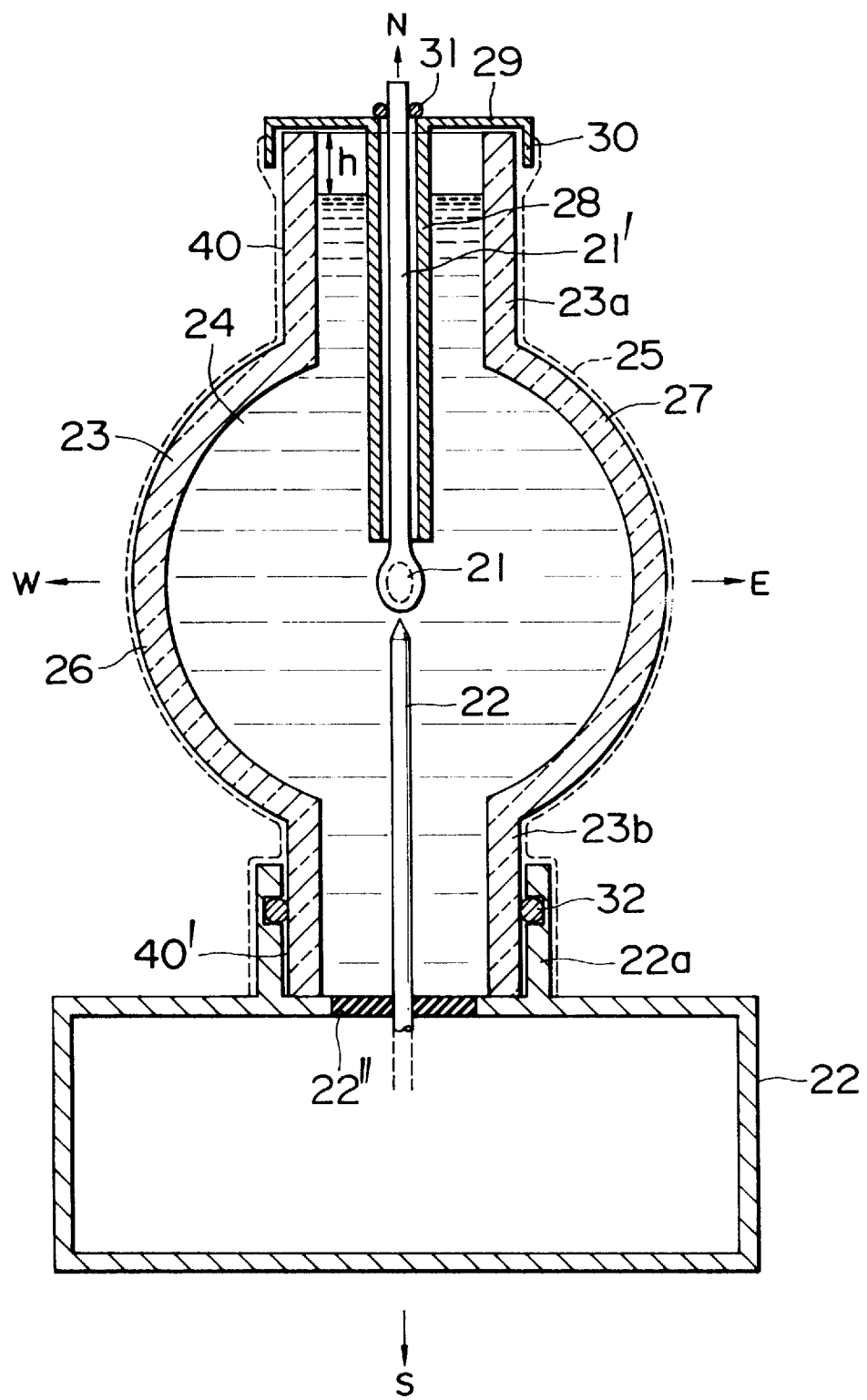
FIG. 5 is an enlarged sectional view showing essential portions of the fourth embodiment of the invention.
Figure 6:
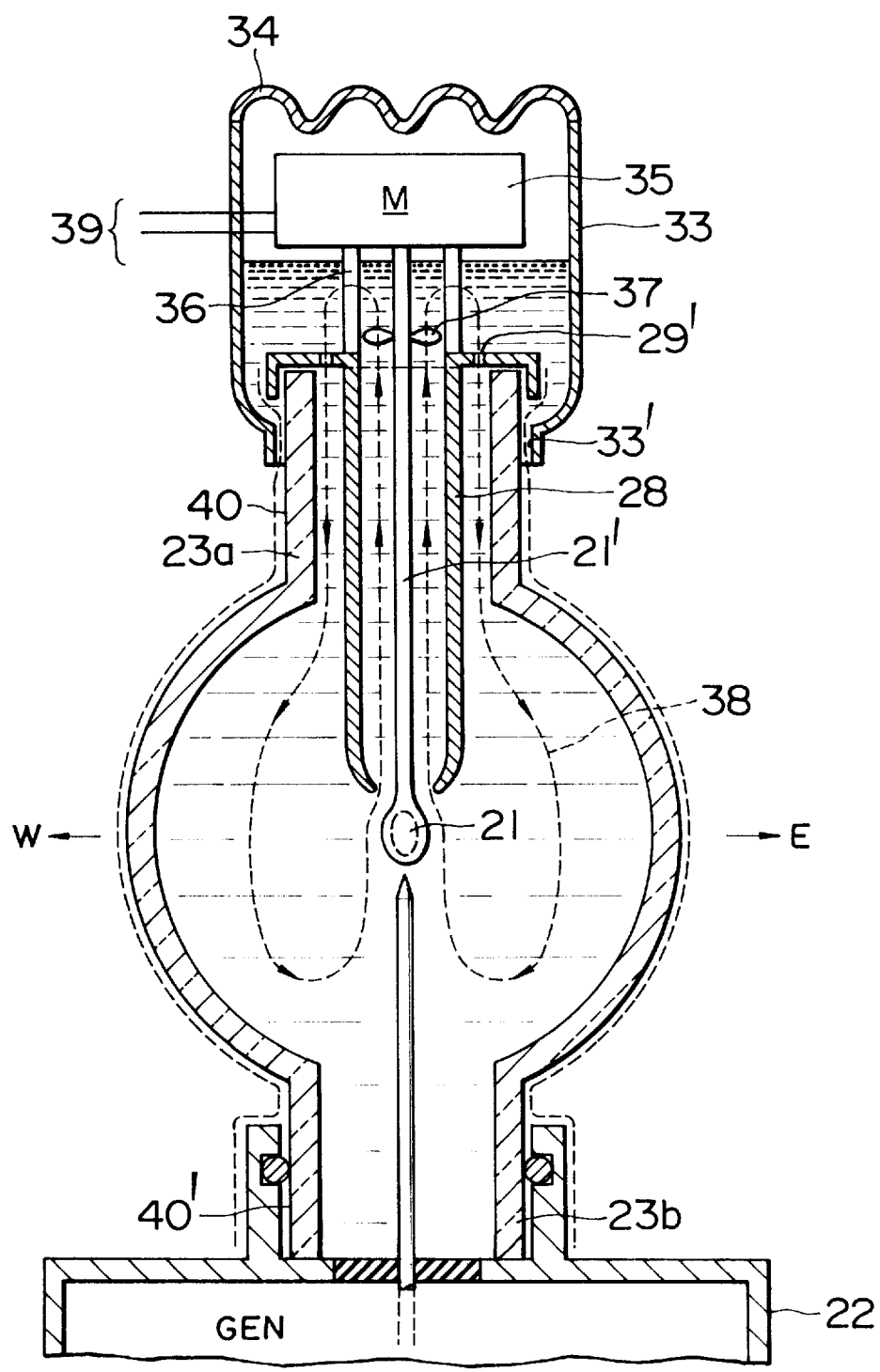
FIG. 6 is a sectional view showing essential portions of a modification of the fourth embodiment of the invention.

FIG. 6 shows a modification of the device shown in FIG. 5, which comprises a liquid stirring means for the purpose of increasing the output of the device.

In FIG. 6, reference numerals 29' denote a number of openings each having a diameter of about 1 to 3 mm formed in the conductor cap 29. The area rate of the openings is about 50% to the whole surface of the body of the cap 29. Reference numerals 33 denote an extended container means whose portion 33' is sealed with an adhesive or another sealing member to prevent the liquid to leak. Reference numerals 34 denote a flexible member which can allow expansion and shrinkage of the liquid, 35 a motor, 36 a motor mounting member, 37 a liquid stirring means or a pump means, 38 a liquid flow, and 39 a wiring of the motor. A rotary shaft of the motor is coaxial with the lamp stem so that the liquid stirring means 37, as well as the lamp 21, is rotated by the motor. It is therefore possible to speed up the heat transfer from the lamp to the liquid and the convection of the liquid.

This embodiment may be modified in such a manner that, by making use of a liquid transportation pipe means, the liquid is transported to a rear wall of a cabinet of the display device where the liquid is passed through a heat exchanger to release heat to the outside, and then is returned to the container means.

The present invention can be materialized in various embodiments, and it is possible to embody the invention by optionally combining the types I, II and III of the present invention shown in Table 1.

As will be apparent from the above, according to the invention, it is possible to decrease and eliminate deposition of dust on the surfaces of the main optical elements as well as to achieve the dissipation of heat.

Accordingly, it is possible to provide a projection type liquid crystal display device which is further improved in image quality and has a longer lifetime.

What is claimed is:

1. A projection type liquid crystal display device comprising light source means, collimator means, light path wall means which defines a closed space, liquid crystal panel means which produces an image, projection lens means, and screen means, said light path wall means surrounding at least one of collimator means and liquid crystal panel means, wherein said light path wall means is provided with thermal resistance reducing means for the inner surface thereof comprising Peltier effect device means which is provided on said light path wall means.

2. A projection type liquid crystal display device according to claim 1, wherein said thermal resistance reducing means comprises forced convection means which is provided in said closed space defined by said light path wall means.

3. A projection type liquid crystal display device according to claim 1, wherein said collimator means comprises a lens.

4. A projection type liquid crystal display device according to claim 1, wherein said light source means comprises a reflector in one of said collimator means.

5. A projection type liquid crystal display device according to claim 1, wherein said collimator means includes a plurality of collimator elements and said light path wall means defines said closed space in corporation with of said collimator elements.

6. A projection type liquid crystal display device according to claim 1, wherein said collimator means includes a plurality of collimator elements and said light path wall means defines said closed space in corporation with one of said collimator elements and said projection lens means.

7. A projection type liquid crystal display device comprising light source means, collimator means, light path wall means which defines a closed space, liquid crystal panel means which produces an image, projection lens means, and screen means, said light path wall means surrounding at least one of collimator means and liquid crystal panel means, wherein said light path wall means is provided with thermal resistance reducing means for the inner surface thereof and wherein said light source means comprises a liquid container means which contains liquid and a lamp means which is immersed in said liquid, said liquid container means comprising a collimator wall section and a light passing wall section and at least a part of said liquid container means being a spherical wall section.

8. A projection type liquid crystal display device according to claim 7, wherein a forced convection means is installed in said liquid container to produce a convection in said liquid.

9. A projection type liquid crystal display device according to claim 8, wherein said forced convection means comprises a mechanical stirrer.

10. A projection type liquid crystal display device according to claim 7, wherein a forced convection means is positioned by a side of said liquid container, which produces an air flow toward said liquid container to cool it.

11. A projection type liquid crystal display device according to claim 3, wherein said lens comprises a Fresnel lens.

12. A projection type liquid crystal display device comprising:
- a light source;
- a plurality of collimator elements;
- a liquid crystal panel which produces an image;
- a light path wall which defines a closed space and which surrounds and supports at least one of said collimator elements and said liquid crystal panel, said light path wall being provided with a Peltier effect element on its outer surface;
- a projection lens; and
- a screen.

13. A projection type liquid crystal display device comprising:
- a light source;
- a plurality of collimator elements;
- a liquid crystal panel which produces an image;
- a light path wall which defines a closed space and which surrounds and supports at least one of said collimator elements and said liquid crystal panel;
- a projection lens; and
- a screen,
- wherein any one of rotating blades driven by a motor and a pump is installed in said closed space defined by said light path wall, which produces a convection gas flow in said closed space whereby heat releasing is promoted through said light path wall.

14. A projection type liquid crystal display device comprising a light source, collimator elements, a liquid crystal panel which produces an image, a projection lens, and a screen, wherein:
said light source comprises a liquid container which contains liquid and a lamp which is immersed in said liquid, said liquid container comprising a collimator wall section and a light passing wall section and at least a part of said liquid container being a spherical wall section, and wherein a forced convection means is installed in said liquid container to produce convection in said liquid.

15. A projection type liquid crystal display device according to claim 14, wherein said forced convection means comprises a mechanical stirrer.

16. A projection type liquid crystal display device according to claim 14, wherein a forced convection means is positioned by a side of said liquid container, which produces an air flow toward said liquid container to cool it.

17. A projection type liquid crystal display device according to claim 16, wherein said forced convection means is a cooling fan.

18. A projection type liquid crystal display device according to claim 16, wherein said forced convection means is an air blower.

19. A projection type liquid crystal display device comprising a light source, collimator elements, a liquid crystal panel which produces an image, a projection lens, and a screen, wherein:
said light source comprises a liquid container which contains liquid and a lamp which is immersed in said liquid, said liquid container comprising a collimator wall section and a light passing wall section and at least a part of said liquid container being a spherical wall section, and wherein a forced convection means is positioned by a side of said liquid container, which produces an air flow toward said liquid container to cool it.

20. A projection type liquid crystal display device according to claim 19, wherein said forced convection means is a cooling fan.

21. A projection type liquid crystal display device according to claim 19, wherein said forced convection means is an air blower.

* * * * *